United States Patent [19]

Sommese et al.

[11] Patent Number: 5,427,750
[45] Date of Patent: * Jun. 27, 1995

[54] POLYMERS FOR REMOVING HUMATES FROM BAYER PROCESS LIQUORS

[75] Inventors: Anthony G. Sommese, Naperville; Robert P. Mahoney, Warrenville, both of Ill.

[73] Assignee: Nalco Chemical Company, Naperville, Ill.

[*] Notice: The portion of the term of this patent subsequent to Sep. 13, 2011 has been disclaimed.

[21] Appl. No.: 146,283

[22] Filed: Oct. 29, 1993

[51] Int. Cl.⁶ .......................... B01D 21/01; C01F 7/00
[52] U.S. Cl. .................................... 423/130; 423/121; 423/122; 210/734; 210/735
[58] Field of Search .................. 423/130, 121, 122; 210/734, 735

[56] References Cited

U.S. PATENT DOCUMENTS

| | | | |
|---|---|---|---|
| 3,288,770 | 11/1966 | Butler | 210/735 |
| 4,046,855 | 9/1977 | Schepers et al. | 423/130 |
| 4,101,629 | 7/1978 | Mercier et al. | 423/121 |
| 4,215,094 | 7/1980 | Inao et al. | 423/123 |
| 4,217,214 | 8/1980 | Dubin | 210/728 |
| 4,263,261 | 4/1981 | Yamada et al. | 423/121 |
| 4,275,042 | 6/1981 | Lever | 423/130 |
| 4,275,043 | 6/1981 | Guyra | 423/130 |
| 4,280,987 | 7/1981 | Yamada et al. | 423/119 |
| 4,335,082 | 6/1982 | Matyasi et al. | 423/122 |
| 4,421,602 | 12/1983 | Brunnmueller et al. | 162/168.2 |
| 4,578,255 | 3/1986 | Roe et al. | 423/130 |
| 4,678,585 | 7/1987 | Brownrigg | 210/727 |
| 4,705,640 | 11/1987 | Whittaker | 210/733 |
| 4,880,497 | 11/1989 | Pfohl et al. | 162/135 |
| 4,921,621 | 5/1990 | Costello et al. | 252/8.513 |
| 4,952,656 | 8/1990 | Lai et al. | 525/328.2 |
| 4,999,170 | 3/1991 | Brown | 423/112 |
| 5,037,927 | 8/1991 | Itagaki et al. | 526/307.7 |
| 5,126,395 | 6/1992 | End et al. | 524/801 |
| 5,133,874 | 7/1992 | Spitzer et al. | 210/734 |
| 5,284,634 | 2/1994 | Strominger et al. | 423/130 |
| 5,346,628 | 9/1994 | Sommese et al. | 210/734 |

*Primary Examiner*—Steven Bos
*Attorney, Agent, or Firm*—Robert A. Miller; James J. Drake

[57] ABSTRACT

Organic impurities are removed from Bayer process liquors using a polymer which contains vinylamine and/or vinylformamide.

14 Claims, No Drawings

5,427,750

POLYMERS FOR REMOVING HUMATES FROM BAYER PROCESS LIQUORS

FIELD OF INVENTION

The invention relates to the use of vinylamine and/or vinylformamide containing polymers to treat Bayer process liquors containing organic impurities.

DESCRIPTION OF THE PRIOR ART

Alumina trihydrate, the precursor of many alumina-based products, including calcined alumina used for making metallic aluminum by reduction, is most commonly obtained from alumina-containing ores, such as bauxite. Recovery of the alumina content of bauxite is generally accomplished by the well-known Bayer process which involves the digestion of the bauxite with a caustic medium at elevated temperatures and pressures. Digestion of the bauxite results in a saturated sodium aluminate liquor, commonly referred to as "pregnant liquor" from which the alumina content is recovered by precipitation, usually through addition of seed alumina.

Bauxite is found in many parts of the world and the composition of the ores may vary from place to place. Many bauxites contain organic impurities and these organic impurities will be co-extracted with the alumina content of the ore during digestion and will contaminate the produced liquor. Some of the organic impurity content found in the ores consists of high molecular weight compounds, such as humic acids, a portion of which will decompose to lower molecular weight compounds during the caustic digestion process, thereby producing a whole spectrum of organic salts dissolved in the liquor. A part of the organic impurities dissolved in the liquor consists of color-causing compounds, such as humates, and, consequently, the pregnant liquor will usually possess a dark red color. Since the Bayer process involves extensive recycling of the used caustic liquor to the digestion stage, the organic impurity content of the liquor will continuously increase. The accumulation of organic impurity content can reach such high levels so as to seriously interfere with the economic and efficient production of alumina trihydrate unless such accumulation can be prevented or at least controlled.

Since the control of organic impurity levels in Bayer process liquors is an important facet in the production of alumina trihydrate, several methods have already been developed for such organic impurity level control. U.S. Pat. Nos. 4,046,855, 4,101,629, 4,215,094, 4,275,042, 4,275,043, 4,335,082, 4,280,987 and 4,578,255 each disclose a process for removing organic impurities from a Bayer process liquor.

Generally, the present invention relates to the use of water-soluble polymers containing vinylamine and/or vinylformamide to treat Bayer process liquors. These polymers facilitate the removal of organic impurities from Bayer process liquors. More specifically, the invention relates to improved polymers for removing organic impurities from Bayer liquors. The polymers of the invention contain vinylamine and/or vinylformamide alone or in combination with acrylic acid to produce copolymers or terpolymers.

SUMMARY OF THE INVENTION

The invention provides a method for removing organic impurities from a Bayer process liquor. The method comprises adding to a Bayer process liquor containing organic impurities and suspended solid particles a polymer which contains from about 1 to about 99% by weight of at least one monomer selected from the group consisting of vinylamine and vinylformamide.

DESCRIPTION OF THE PREFERRED EMBODIMENTS

This invention relates to the purification of Bayer process liquors, and more particularly, it concerns a process for the removal or at least reduction of the organic impurity level of Bayer process liquors. For the purposes of the invention, the terms "Bayer process liquors" or "liquor" relate to any caustic liquor which is generated in the Bayer process or is used to dissolve alumina values from bauxite. Typical examples of Bayer process liquors include pregnant liquor, spent liquor, washer underflow, and slurries containing precipitated alumina trihydrate, as well as the liquor containing dispersed red mud particles. All of these liquors have varying caustic contents and contain organic impurities. The terms "organic impurity" or "organic impurities" refer to organic matter, such as humic acids and humates, present in Bayer process liquors, the type and quantity of which varies considerably with bauxite source and Bayer plant operating conditions. The greater part of the organic impurities is present as the alkali salts of organic acids which are colorless and, apart from the oxalate content, present only a minor problem from the viewpoint of the quality of the alumina trihydrate produced from the liquor. Process conditions and alumina trihydrate quality are significantly affected by portions of highly colored materials most often called "humates", although they may include lignin derivatives. These colored materials are of uncertain composition and possess complex structures. For simplicity, all of these colored materials present in Bayer process liquors are referred to hereinafter as "humates". The presence of humates in Bayer process liquors not only affects the quality of the produced alumina trihydrate but these colored materials also act as stabilizers for other dissolved organic impurities, for example, alkali salts of oxalic acid. In fact, it is believed that the humates extracted with the bauxite ores may lead to the presence of the majority of low molecular weight organic acids and impurities above.

This stabilizing effect of the humates keeps the lower molecular weight organic impurities in solution until over-saturation concentration is reached or exceeded, uncontrollable precipitation of these lower molecular weight compounds, particularly fine oxalates, can occur during precipitation of alumina trihydrate and the co-precipitated oxalate can seriously interfere with the production of satisfactory alumina trihydrate. For example, the oxalate can coat the produced trihydrate, requiring extensive washing operations to remove the adhered oxalate from the trihydrate surface. The precipitated oxalate can cause nucleation of alumina trihydrate resulting in the formation of very finely distributed trihydrate which due to the small particle size will not meet product standards. The oxalate can also precipitate on the surface of alumina trihydrate seed added to pregnant liquor for the production of alumina trihydrate, thus preventing precipitation of the desired product trihydrate. In the equipment used in the Bayer process, uncontrolled precipitation of the oxalate can cause serious scaling of process vessel walls resulting in reduced heat-transfer efficiency and additional labor involved in the removal of the scale. Thus, it can be readily concluded that control of the humate content of Bayer process liquors is of paramount interest if a satisfactory alumina trihydrate is to be produced in an efficient and economic manner.

According to one embodiment of the present invention, a method is provided to control the humate or colored organic matter content of Bayer process liquors. This goal is achieved by removal or at least significant reduction of humate content by treating Bayer process liquors containing humates in the presence of dispersed solids with a water-soluble polymer containing from about 1 to about 100 mole percent vinylamine and/or a monomer hydrolyzable to vinylamine. The dispersed solids can be the type generated by the Bayer process, for example, red mud particles, alumina trihydrate, and oxalate salts. The dispersed solids also include various filter aids which are generally incorporated in the liquor prior to filtration. Such filter aids may include certain calcium compounds, for example, calcite, aragonite, or trihydrated calcium aluminate which enhance the filtration step. The dispersed solids may also include pretreated filter aids or pretreated seed crystals which are added to the Bayer process only after they are intimately mixed with the polymers of the invention. By mixing the polymer and dispersed solid prior to adding it to the Bayer process, a polymer-solid complex is formed, wherein, it is believed, the polymer adheres to the dispersed solid. The polymer-solid complex may then be advantageously added to Bayer process liquors to remove humates and color bodies. For example, filter aids may be precoated with the polymers of the invention prior to being used to precoat the filters used to remove colloidal matter prior to seeding and crystallizing aluminum trihydrate.

More generally, the invention provides a process for treating a Bayer process liquor containing organic impurities, such as humates. The invention provides an improved method for removing organic impurities from these liquors. The invention uses a polymer treating agent (hereinafter treating agent) to accomplish this goal. According to the invention, the treating agent is a copolymer or terpolymer which contains from about 1 to about 99 mole percent vinylamine monomer and/or a monomer hydrolyzable to vinylamine, and/or from 1-97 mole percent of vinylformamide, vinyl alcohol or vinyl acetate monomer. The remaining portion of the polymer is preferably acrylic acid monomer or a monomer hydrolyzable to acrylic acid. For purposes of this invention, vinylamine monomers includes vinylamine and those monomers which are hydrolyzable to the following formula:

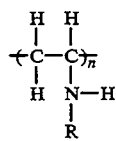

wherein: R is, preferably, one substituent group selected from the group consisting of hydrogen and an alkyl group having from 1–10 carbon atoms. More preferably, R is hydrogen or is an alkyl group having 1 to 4 carbons.

The vinylformamide monomer of the invention is non-hydrolyzed and has the following structure:

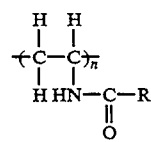

wherein: R is, preferably, one substituent group selected from the group consisting of hydrogen and an alkyl group having from 1–10 carbon atoms. More preferably, R is hydrogen or is an alkyl group having 1 to 4 carbons.

For purposes of the invention, acrylic acid monomer includes acrylic acid and those monomers hydrolyzable to the following formula:

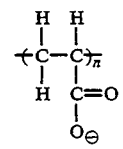

One preferred method for producing the vinyl acetate/vinylamine containing polymers of the invention is to polymerize vinylformamide and vinyl acetate, followed by hydrolysis to the alcohol.

According to one embodiment of the invention, the Bayer process liquor is treated with a vinylamine/acrylic acid copolymer. Preferably, the copolymer will include from about 1 to about 99 mole % vinylamine and about 1 to about 99% acrylic acid. More preferably, the copolymer will include from about 50 to about 99 mole % vinylamine and from about 50 to about 1 mole % acrylic acid. Most preferably, the vinylamine is included in the copolymer in an amount of from about 80 to about 99 mole % and the acrylic acid is included in an amount of from about 20 to about 1 mole %.

According to one embodiment of the invention, the Bayer process liquor is treated with a vinylamine/vinyl alcohol copolymer. Preferably, the copolymer will include from about 1 to about 99 mole % vinylamine and about 1 to about 99% vinyl alcohol. More preferably, the copolymer will include from about 2 to about 50 mole % vinyl alcohol and from about 98 to about 50 mole % vinylamine. Most preferably, the vinyl alcohol is included in the copolymer in an amount of from about 10 to about 20 mole % and the vinylamine is included in an amount of from about 90 to about 80 mole %.

According to a further embodiment of the invention, the Bayer process liquor is treated with an acrylic acid/vinylamine/vinylformamide terpolymer of the invention. Preferably, the terpolymer includes from about 1 to about 97% vinylamine, from about 1 to about 97% vinylformamide and from about 97 to about 1% acrylic acid. More preferably, the terpolymer includes from about 10 to about 50% acrylic acid, from about 10 to about 50% vinylformamide and from about 80 to about 50% vinylamine. Most preferably, the terpolymer includes from about 10 to about 20% acrylic acid, from about 10 to about 20% vinyl-formamide and from about 80 to about 60% vinylamine.

The polymers of the present invention are added to the Bayer process liquor at a dosage of from about 1 to about 200 parts per million (ppm). More preferably, the polymers of the invention are added to the Bayer process liquor in an amount of from about 5 to about 150 ppm. Most preferably, the polymers of the invention are added to the Bayer process liquor in an amount of from about 10 to 50 ppm.

Incorporation of the polymer ("treating agent") in Bayer process liquors can be suitably accomplished in those Bayer process stages where the liquor either contains dispersed solids or to which solids may be added and dispersed. These stages include the settler(s) in which the residue from the digestion of bauxite, red mud, is separated from the "pregnant" liquor containing the desired sodium aluminate; and the washers in which the red mud discharged from the settler(s) is washed to recover alumina and soda values.

According to another advantageous embodiment of the invention, humate is removed from press feed liquor. The pregnant liquor charged to the press feed tank still contains suspended solids which have to be removed prior to subjecting the pregnant liquor to seeded precipitation. Removal of the suspended solids is generally accomplished by filtration in the presence of filter aids, such as certain calcium compounds. Conventionally, Kelly-type filters are employed and the filters can be coated with a calcium-containing filter aid which allows efficient filtration of the pregnant liquor-containing suspended solids. Effective removal of humates can be accomplished by introducing the polymers of the invention into the filter aid slurry prior to the subsequent mixing of the filter aid with the press feed liquor. Coating of the surface of the filter aid accomplished two purposes. One, uniform distribution of the polymer on the surface can be assured; and two, good contact with the humate-contaminated liquor can be achieved. Alternatively, the polymer can be introduced into the press feed liquor after the dispersion of the polymer is assured. It is to be understood that any other type of filter can be equally utilized in the treatment, and in lieu of the calcium-containing filter aid, other types of filter aids, such as cellulosic materials, can also be employed.

In another preferred embodiment of the invention, the removal of humates from Bayer process liquor is accomplished during the trihydrate filtration stage of the Bayer process. The trihydrate filtration stage of the Bayer process consists of filtering precipitated and, if desired, washed alumina trihydrate. The filtered trihydrate is then subjected to calcination to convert it to reduction-grade alumina oxide. The resultant filtrate from the filtration step is usually recycled to the Bayer process. This alumina trihydrate slurry contains humates which, if not removed, would be recycled to the Bayer process. Thus, removal of the humates in this filtration stage would prevent or, at least, reduce accumulation of humates through recycle of the filtrate. Humates can be successfully removed from the alumina trihydrate slurry by introducing the polymers of the invention into the slurry to be filtered. Introduction of the polymers into the slurry is suitably accomplished by coating the surface of alumina trihydrate with the polymers and charging the coated trihydrate into the slurry. In the alternative, the polymers of the invention may also be introduced into the slurry itself without precoating alumina trihydrate and if good dispersion of the polymer in the slurry is assured, then the polymer will uniformly coat the surface of the alumina trihydrate present in the slurry. The coated trihydrate will allow removal of the humates from this slurry by the contact of the surface adhered polymer with the humates.

Processes for making the polymers of the invention are well known in the art. U.S. Pat. Nos. 5,126,395, 5,037,927, 4,952,656, 4,921,621, 4,880,497 and 4,421,602 all describe methods for preparing the polymers of the invention. According to one embodiment of the invention, the amine-containing polymers of the invention are synthesized by copolymerizing acrylic add (as sodium acrylate) with vinylformamide. Solution polymerization produces desirable high molecular weights. The resulting polymers of sodium acrylate/vinylformamide are susceptible to alkaline or acid hydrolysis which converts some or all of the amide groups to amine groups. This hydrolysis phenomena is described in U.S. Pat. No. 4,421,602,the disclosure of which is incorporated herein by reference. Thus, by controlling the stoichiometry of the hydrolyzing agent (acid or base) it is possible to produce sodium acrylate/vinylamine copolymers or sodium acrylate/vinylamine/vinylformamide terpolymers.

For example, it has been determined that a 1% solution of a 60/40 vinylformamide/sodium acrylate polymer when subjected to hydrolysis for three hours at 85° C. using 1% caustic solution, will produce a terpolymer of vinylamine/vinylformamide/sodium acrylate. If the concentration of the caustic is increased to 5%, only the copolymer of vinylamine/sodium acrylate is produced. It should be noted that all the vinylamine contained in the polymers of the invention is preferably the result of hydrolysis to yield the amine, and not by copolymerization with vinylamine (which is unavailable and is not known to polymerize) nor is the vinylamine produced through rearrangement, such as the Hoffman Rearrangement of acrylamide. It is conceivable, to those skilled in the art, to polymerize vinylformamides, with esters or amides of acrylic acid, which when subjected to hydrolysis yield acrylate-vinylamine (formamide) polymers.

According to the invention, the hydrolysis of the polymer is followed by addition to a Bayer liquor. Preferably, since caustic hydrolysis is required for amide hydrolysis, a vinylformamide/sodium acrylate polymer can be added directly to the Bayer liquor without prior hydrolysis. The highly caustic nature of the Bayer liquor coupled with the high temperature (40°–110°C.) should effectively hydrolyze the amide groups. The amount of hydrolysis will depend on the original polymer content, the amount of caustic in the Bayer liquor, the time in the liquor and the temperature of the Bayer liquor.

The following examples are presented to describe preferred embodiments and utilities of the invention and are not meant to limit the invention unless otherwise stated in the claims appended hereto.

EXAMPLE 1

The polymers of the invention were laboratory tested to establish their effectiveness in removing humates from Bayer process liquor. Humate removal tests were conducted with a series of vinylamine and vinylformamide-containing polymers. The composition of these polymers is identified in Table 1 below.

TABLE 1

| POLYMER COMPOSITIONS | |
|---|---|
| Polymer | Composition |
| A | 100% p-DADMAC |
| B | p-vinylamine (1.2 MM MW) |
| C | 6/94 p-vinylamine/vinyl alcohol |
| D | 45/55 NaAcrylate/vinylamine |
| E | 70/30 p-vinylamine/ vinylformamide |

TABLE 1-continued

| POLYMER COMPOSITIONS | |
|---|---|
| Polymer | Composition |
| F | 85/15 p-vinylamine/vinyl alcohol |
| G | p-vinylamine (2 MM MW) |
| H | p-vinylamine (200–300 K MW) |
| J | 60/40 p-vinylamine/NaAcrylate |
| K | 80/20 p-NaAcrylate/vinylamine |

The liquor that was evaluated was a composition of actual Bayer process liquor from operating plants which was mixed with a synthetic Bayer process liquor which was spiked with sodium humate obtained from the Aldrich Chemical Company. The test liquor was a caustic sodium aluminate liquor containing humates with an absorbance of 0.998 at 575 nm. A 50 ml sample of liquor was mixed with 5 grams of alumina trihydrate seed for five minutes. Fifteen tests were conducted. These tests are summarized in Table 2 below.

TABLE 2

| HUMATE REMOVAL TEST RESULTS | | | | |
|---|---|---|---|---|
| Test # | Polymer | Dose (mg/L) | Abs 575 nm | % Abs Remaining |
| 1 | A | 100 | 0.695 | 81 |
| 2 | — | 0 | 0.854 | 100 |
| 3 | B | 100 | 0.551 | 65 |
| 4 | C | 100 | 0.727 | 85 |
| 5 | D | 100 | 0.769 | 90 |
| 6 | E | 100 | 0.578 | 68 |
| 7 | F | 100 | 0.624 | 73 |
| 8 | G | 100 | 0.564 | 66 |
| 9 | H | 100 | 0.548 | 64 |
| 10 | J | 100 | 0.813 | 95 |
| 11 | K | 100 | 0.750 | 88 |
| 12 | A + H | 100 + 100 | 0.353 | 41 |
| 13 | A | 200 | 0.259 | 30 |
| 14 | H | 200 | 0.480 | 56 |
| 15 | A + H | 50 + 50 | 0.452 | 53 |

After the 5 grams of alumina trihydrate seed was added, the chemical treatment was added with one minute of stirring. The slurry was filtered through 0.45 micron filter paper, and the filtrate liquor was analyzed spectrophotometrically for humates. The absorbance at 575 nm was measured for each treatment and the results are recorded in Table 2.

Test 2, the control test, showed an absorbance of 0.854 at 575 nm. Test 1, utilized a homopolymer of polydiallydimethylammonium chloride (POLYDAD-MAC) as the standard humate removal treatment for comparison. POLYDADMAC homopolymers are used in the industry for this application. Referring to Table 2, the polymers of the invention performed as well or better when compared to the standard POLYDAD-MAC treatment in the industry. Moreover, a significant synergistic activity was documented when homopolymers of polyvinylamine and POLYDADMAC were used in combination to remove humate.

Changes can be made in the composition, operation and arrangement of the method of the present invention described herein without departing from the concept and scope of the invention as defined in the following claims:

We claim:

1. A method for removing organic impurities from a Bayer process liquor, the method comprises adding to a Bayer process liquor containing suspended solid particles and organic impurities a polymer which contains from about 1 to about 99 mole percent vinylamine and from about 1 to about 99 mole percent of at least one monomer selected from the group consisting of acrylic acid, vinyl alcohol, vinyl acetate, and vinylformamide and then filtering the Bayer process liquor to remove the organic impurities.

2. The method of claim 1 where the polymer contains from about 50 to about 99 mole percent of vinylamine.

3. The method of claim 1 where the polymer is a copolymer which contains from about 1 to about 99 mole percent of vinylformamide.

4. The method of claim 1 where the polymer contains from about 80 to about 99 mole percent of vinylamine.

5. The method of claim 1 where the polymer is mixed with a filter aid before it is added to the Bayer process liquor.

6. A method for removing organic impurities from a Bayer process liquor, the method comprises adding to a Bayer process liquid containing organic impurities from about 1 to about 200 parts per million of a polymer which contains from about 1 to about 100 mole percent vinylamine and from about 1 to about 99 mole percent of at least one other monomer selected from the group consisting of acrylic acid, vinyl alcohol, vinyl acetate and vinylformamide and then filtering the Bayer process liquor to remove the organic impurities.

7. The method of claim 6 wherein the polymer is added to the Bayer process liquor in a concentration of from about 10 to about 100 parts per million.

8. The method of claim 6 wherein the polymer is added to the Bayer process liquor in combination with from about 5 to about 200 parts per million of a polydiallyldimethylammonium chloride homopolymer.

9. The method of claim 6 wherein the polymer is intimately mixed with a filter aid before it is added to the Bayer process liquor.

10. The method of claim 6 wherein the polymer includes from about 1 to about 50 mole percent vinylamine, from about 1 to about 50 mole percent vinylformamide and from about 1 to about 50 mole percent acrylic acid.

11. A method for removing organic impurities from a Bayer process liquor, the method comprising:
adding to a Bayer process liquor containing suspended solid particles and organic impurities a homopolymer of vinylamine; and
then filtering the Bayer process liquor to remove the organic impurities.

12. The method of claim 11, wherein the polymer is added to the Bayer liquor in conjunction with a polydiallyldimethylammonium chloride homopolymer.

13. A method for removing organic impurities from a Bayer process liquor, the method comprising:
adding to a Bayer process liquor containing organic impurities from about 1 to about 200 pans per million of a homopolymer of vinylamine; and
then filtering the Bayer process liquor to remove the organic impurities.

14. The method of claim 13, wherein the polymer is added to the Bayer liquor in conjunction with a polydiallyldimethylammonium chloride homopolymer.

* * * * *

UNITED STATES PATENT AND TRADEMARK OFFICE
CERTIFICATE OF CORRECTION

PATENT NO. : 5,427,750
DATED : JUNE 27, 1995
INVENTOR(S) : ANTHONY G. SOMMESE, ET AL

It is certified that error appears in the above-indentified patent and that said Letters Patent is hereby corrected as shown below:

COLUMN 8, LINE 57, CLAIM 13 impurities from about 1 to about 200 <u>pans</u> per mil-

SHOULD READ AS:

impurities from about 1 to about 200 parts per mil-

Signed and Sealed this

Third Day of October, 1995

*Attest:*

BRUCE LEHMAN

*Attesting Officer*  *Commissioner of Patents and Trademarks*